(12) United States Patent
Tajima

(10) Patent No.: US 10,864,844 B2
(45) Date of Patent: Dec. 15, 2020

(54) VEHICLE LAMP FITTING

(71) Applicant: KOITO MANUFACTURING CO., LTD., Tokyo (JP)

(72) Inventor: Keiichi Tajima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/604,843

(22) PCT Filed: Apr. 3, 2018

(86) PCT No.: PCT/JP2018/014228
§ 371 (c)(1),
(2) Date: Oct. 11, 2019

(87) PCT Pub. No.: WO2018/190191
PCT Pub. Date: Oct. 18, 2018

(65) Prior Publication Data
US 2020/0164789 A1 May 28, 2020

(30) Foreign Application Priority Data

Apr. 14, 2017 (JP) ................ 2017-080701
Apr. 14, 2017 (JP) ................ 2017-080702

(51) Int. Cl.
*B60Q 1/04* (2006.01)
*F21S 41/657* (2018.01)
*B60Q 1/068* (2006.01)

(52) U.S. Cl.
CPC ........ *B60Q 1/0483* (2013.01); *B60Q 1/0683* (2013.01); *F21S 41/657* (2018.01)

(58) Field of Classification Search
None
See application file for complete search history.

(56) References Cited

U.S. PATENT DOCUMENTS

2004/0057243 A1    3/2004   Takii et al.

FOREIGN PATENT DOCUMENTS

| JP | 2004-106769 A | 4/2004 |
|----|---------------|--------|
| JP | 2009-184432 A | 8/2009 |
| JP | 2009-193866 A | 8/2009 |
| JP | 2009-205849 A | 9/2009 |
| JP | 2010-228563 A | 10/2010 |
| JP | 2011-051555 A | 3/2011 |
| JP | 5079860 B2    | 11/2012 |

OTHER PUBLICATIONS

International Search Report for PCT/JP2018/014228, dated Jun. 12, 2018.

*Primary Examiner* — Vip Patel
(74) *Attorney, Agent, or Firm* — Sughrue Mion, PLLC

(57) ABSTRACT

Provided are: a lamp body (21) housing a light source; a joint (24) secured to a lower portion of the lamp body (21); a bracket (30) connected with the joint (24); and an actuator (40) including a movable shaft (42) that moves upward and downward. The joint (24) is connected to the bracket (30) through a fulcrum member (50) pivotable to the bracket (30), and the movable shaft (42) is connected to the joint (24) on the rear side of the fulcrum member (50).

13 Claims, 14 Drawing Sheets

VEHICLE LAMP FITTING

CROSS REFERENCE TO RELATED APPLICATIONS

This application is a National Stage of International Application No. PCT/JP2018/014228 filed Apr. 3, 2018, claiming priority based on Japanese Patent Application No. 2017-080701 filed Apr. 14, 2017 and Japanese Patent Application 2017-080702 filed Apr. 14, 2017.

TECHNICAL FIELD

The present invention relates to a vehicle lamp fitting.

BACKGROUND ART

It has been known that a vehicle lamp fitting typified by an automobile headlight is capable of changing the radiation direction of light in the left and right direction or in the upward and downward direction, in accordance with, for example, the travel direction of a vehicle or the attitude of a vehicle.

For example, a vehicle lamp fitting described in Patent Literature 1 below includes a lamp unit, a bracket to which the lamp unit is secured, and an actuator provided at the lower portion of the lamp unit, the actuator being capable of moving the lamp unit. The actuator includes an output shaft rotatable and movable in the forward and backward direction. The output shaft is connected to the lower portion of the lamp unit. The connection between the output shaft and the lamp unit enables the lamp unit to pivot left and right in response to rotation of the output shaft. As a result, the vehicle lamp fitting described in Patent Literature 1 below can change the radiation direction of light in the left and right direction in accordance with the travel direction of a vehicle. The lamp unit includes a supporting shaft at the upper portion thereof. The supporting shaft is rotatably secured to the bracket through a self-aligning metal. Therefore, movement of the output shaft in the forward and backward direction causes the lower portion of the lamp unit to move in the forward and backward direction, so that the lamp unit pivots on the supporting shaft as a fulcrum. In this manner, the direction of light radiated from the lamp unit can be changed in the upward and downward direction. In the vehicle lamp fitting described in Patent Literature 1 below, as above, the upper portion of the lamp unit is supported by the supporting shaft and additionally the lower portion of the lamp unit is supported by the actuator. Thus, the lamp unit is inhibited from deviating at the pivot as above.
[Patent Literature 1] JP5079860 B2

SUMMARY OF INVENTION

A vehicle lamp fitting according to the present invention includes: a lamp body housing a light source; a joint secured to a lower portion of the lamp body; a bracket connected with the joint; and an actuator including a movable shaft that moves upward and downward, in which the joint is connected to the bracket through a fulcrum member pivotable to the bracket, and the movable shaft is connected to the joint on the rear side of the fulcrum member.

In the vehicle lamp fitting according to the present invention, the joint is connected to the bracket through the fulcrum member, and the movable shaft of the actuator is connected to the joint on the rear side of the fulcrum member. Therefore, movement of the movable shaft in the upward and downward direction causes the rear portion of the joint to move in the upward and downward direction with the fulcrum member as a fulcrum. Thus, the rear portion of the lamp body secured to the joint moves in the upward and downward direction. Therefore, the radiation direction of light from the light source housed in the lamp body can be changed in the upward and downward direction. The actuator is disposed behind the joint, so that the vehicle lamp fitting according to the present invention is reduced in thickness.

Preferably, the bracket includes a main portion extending in a left and right direction and an erect portion extending in an upward and downward direction on at least one of a left end and a right end of the main portion, and an optical-axis adjustment mechanism that adjusts an emission direction of light from the light source in the upward and downward direction, is mounted on the erect portion.

The bracket includes the main portion extending in the left and right direction and the erect portion extending in the upward and downward direction, so that no bracket can be formed above the lamp body. Therefore, the vehicle lamp fitting according to the present invention is further reduced in thickness. No bracket is formed above the lamp body, so that the upper portion of the lamp body can be viewed from the front of the vehicle lamp fitting. Thus, the vehicle lamp fitting improves in design.

Preferably, a plurality of the fulcrum members is provided side by side in a left and right direction.

The plurality of the fulcrum members is provided side by side in the left and right direction, so that the joint improves in stability. Thus, the emission direction of light from the light source housed in the lamp body is inhibited from deviating.

Preferably, the movable shaft extends horizontally in a forward and backward direction.

The movable shaft extends horizontally in the forward and backward direction, so that power is transmitted properly easily from the movable shaft to the joint.

Preferably, the bracket includes a cut-away portion at a back of the bracket, and at least part of a connection between the joint and the movable shaft is housed in the cut-away portion when the connection is located at a lowest level.

The formation of the cut-away portion in the bracket and the arrangement of the joint and the movable shaft in that manner, cause the vehicle lamp fitting to be further reduced in thickness.

A vehicle lamp fitting according to the present invention includes: a bracket including a main portion extending in a left and right direction and an erect portion extending in an upward and downward direction on at least one of a left end and a right end of the main portion; a lamp unit disposed above the main portion of the bracket, the lamp unit including a first shaft extending downward; an actuator disposed below the main portion of the bracket, the actuator including a second shaft extending upward, the actuator being configured to rotate the second shaft around an axis of the second shaft; an aligning member secured to the main portion of the bracket, the aligning member holding a rotary shaft including the first shaft and the second shaft coupled, rotatably; and an optical-axis adjustment mechanism mounted on the erect portion, the optical-axis adjustment mechanism being configured to adjust an optical axis of the lamp unit in the upward and downward direction, in which the bracket is not formed above the lamp unit.

In the vehicle lamp fitting according to the present invention, the first shaft of the lamp unit is coupled with the second shaft of the actuator. Thus, rotation of the second shaft by the actuator causes rotation of the lamp unit, so that the radiation direction of light from the lamp unit can be changed in the left and right direction. The aligning member holds the rotary shaft including the first shaft and the second shaft coupled, so that the lamp unit is inhibited from deviating at the rotation of the lamp unit as above. In this manner, the lamp unit is supported only from below the lamp unit, and no bracket is formed above the lamp unit. Thus, the upper portion of the lamp unit can be viewed from the front of the vehicle lamp fitting. Therefore, the vehicle lamp fitting according to the present invention improves in design.

Preferably, the aligning member is a pair of bearings disposed at a predetermined interval in the upward and downward direction.

The pair of bearings disposed apart in the upward and downward direction holds the rotary shaft, so that the rotary shaft is supported at two places mutually apart in the direction of the axis thereof. Thus, the rotary shaft is further inhibited from deviating.

Preferably, the bearing disposed on an upper side of the pair of bearings is a ball bearing.

The load due to the weight of the lamp unit is easily applied to the bearing disposed on the upper side of the pair of bearings. The bearing on the upper side to which a large load is easily applied in that manner is the ball bearing small in rolling resistance, so that the bearing on the upper side is inhibited from deteriorating in sliding at rotation of the rotary shaft. Thus, resistance applied at rotation of the rotary shaft is inhibited from increasing.

Preferably, the pair of bearings each is a ball bearing.

The bearings each is the ball bearing, so that resistance applied to the rotary shaft at rotation of the rotary shaft is further inhibited from increasing.

Preferably, a through hole penetrating in the upward and downward direction is formed at the main portion of the bracket, and the bearing provided on an upper side of the pair of bearings is disposed on a spacer provided on an inner circumferential face of the through hole.

The bearing on the upper side is disposed in that manner, so that the load due to the weight of the lamp unit is easily dispersed into the bracket through the bearing on the upper side. Therefore, the load is inhibited from concentrating on the bearing on the upper side, so that the bearing on the upper side is inhibited from deteriorating in sliding at rotation of the rotary shaft. Thus, resistance applied at rotation of the rotary shaft is further inhibited from increasing.

DESCRIPTION OF EMBODIMENTS

Embodiments of a vehicle lamp fitting according to the present invention will be exemplified below with the accompanying drawings. The embodiments to be exemplified below are intended for easy understanding of the present invention. Thus, the present invention is not limited to the embodiments. Alternations and improvements may be made from the following embodiments without departing from the spirit of the present invention.

First Embodiment

Figure 1:
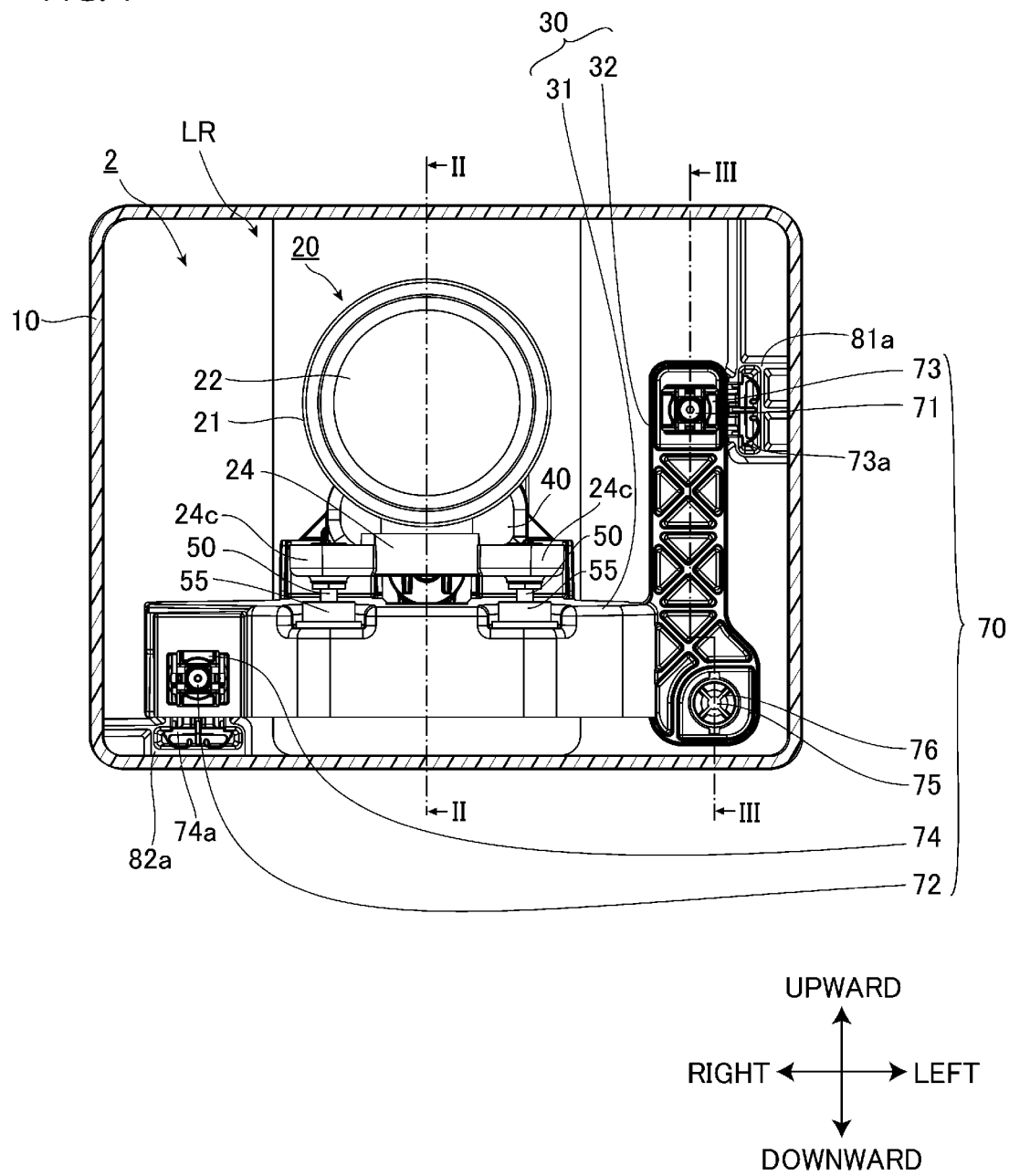
FIG. 1 is a front view of a vehicle lamp fitting according to a first embodiment of the present invention.
Figure 2:
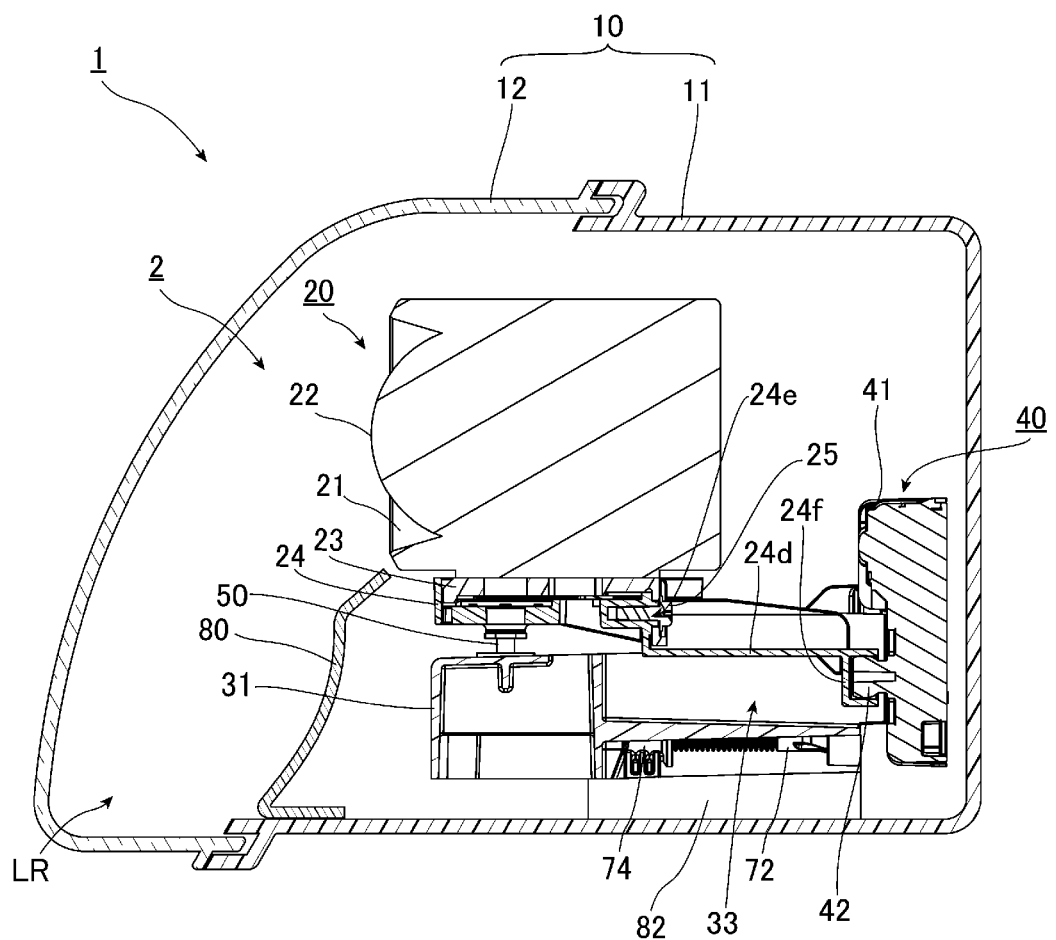
FIG. 2 is a sectional view taken along line II-II of the vehicle lamp fitting illustrated in FIG. 1.
Figure 2:
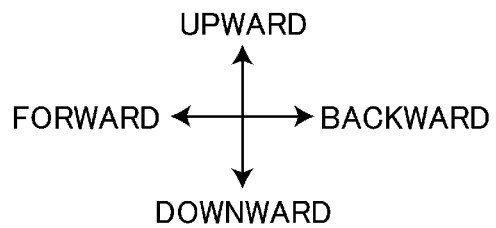

FIG. 1 is a front view of a vehicle lamp fitting according to a first embodiment of the present invention. FIG. 2 is a sectional view taken along line II-II of the vehicle lamp fitting illustrated in FIG. 1. Note that, for easy understanding of the configuration of the vehicle lamp fitting, FIG. 1 illustrates part of a casing 10 in vertical section without any member disposed in front of a movable lamp-fitting unit 2. FIG. 2 illustrates a lamp body 21 and an actuator 40 by hatching without illustrating the internal structures thereof. Left and right, forward and backward, and upward and downward directions in FIGS. 1 and 2 and other figures below are based on the eye point of an occupant in a vehicle as indicated in each figure.

The vehicle lamp fitting according to the present embodiment is a vehicle headlight 1. As illustrated in FIGS. 1 and 2, the vehicle headlight 1 includes, as main constituents, the movable lamp-fitting unit 2, a bezel 80, and the casing 10 housing the movable lamp-fitting unit 2 and the bezel 80.

The casing 10 includes, as main constituents, a lamp housing 11 and a front cover 12. The lamp housing 11 has an opening at the front thereof, and the front cover 12 is secured to the lamp housing 11 such that the opening is covered. A space formed by the lamp housing 11 and the front cover 12 covering the front opening of the lamp housing 11, results in a light room LR. The movable lamp-fitting unit 2 and the bezel 80 are housed in the light room LR.

The bezel 80 is disposed at a position at which the bezel 80 overlaps the lower portion of the movable lamp-fitting unit 2 in the front view of the vehicle headlight 1. The bezel 80 is disposed in that manner, so that the bezel conceals, for example, a bracket 30 to be described later, from the front of the vehicle headlight 1.

Figure 3:
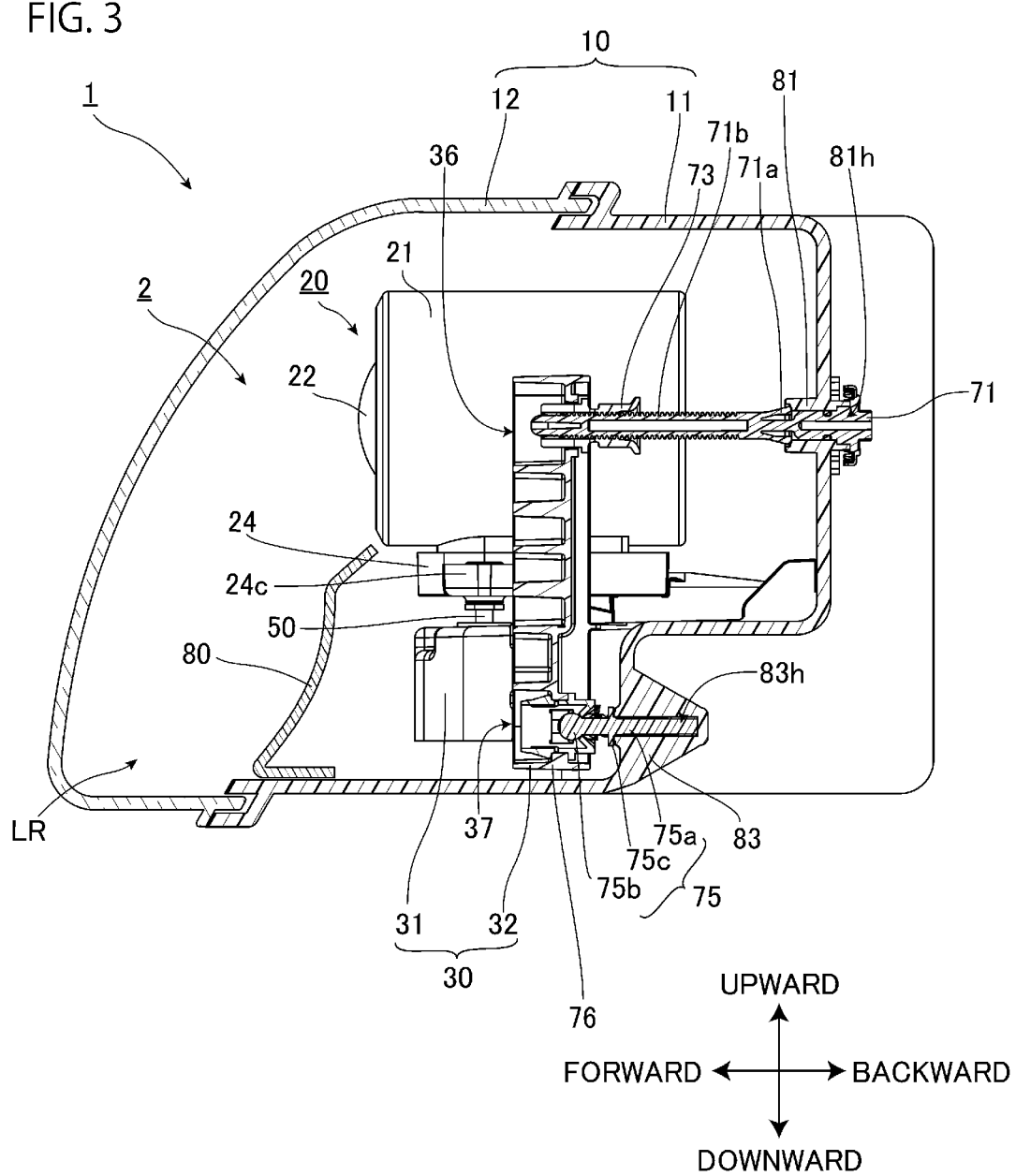
FIG. 3 is a sectional view taken along line III-III of a movable lamp-fitting unit illustrated in FIG. 1.
Figure 4:
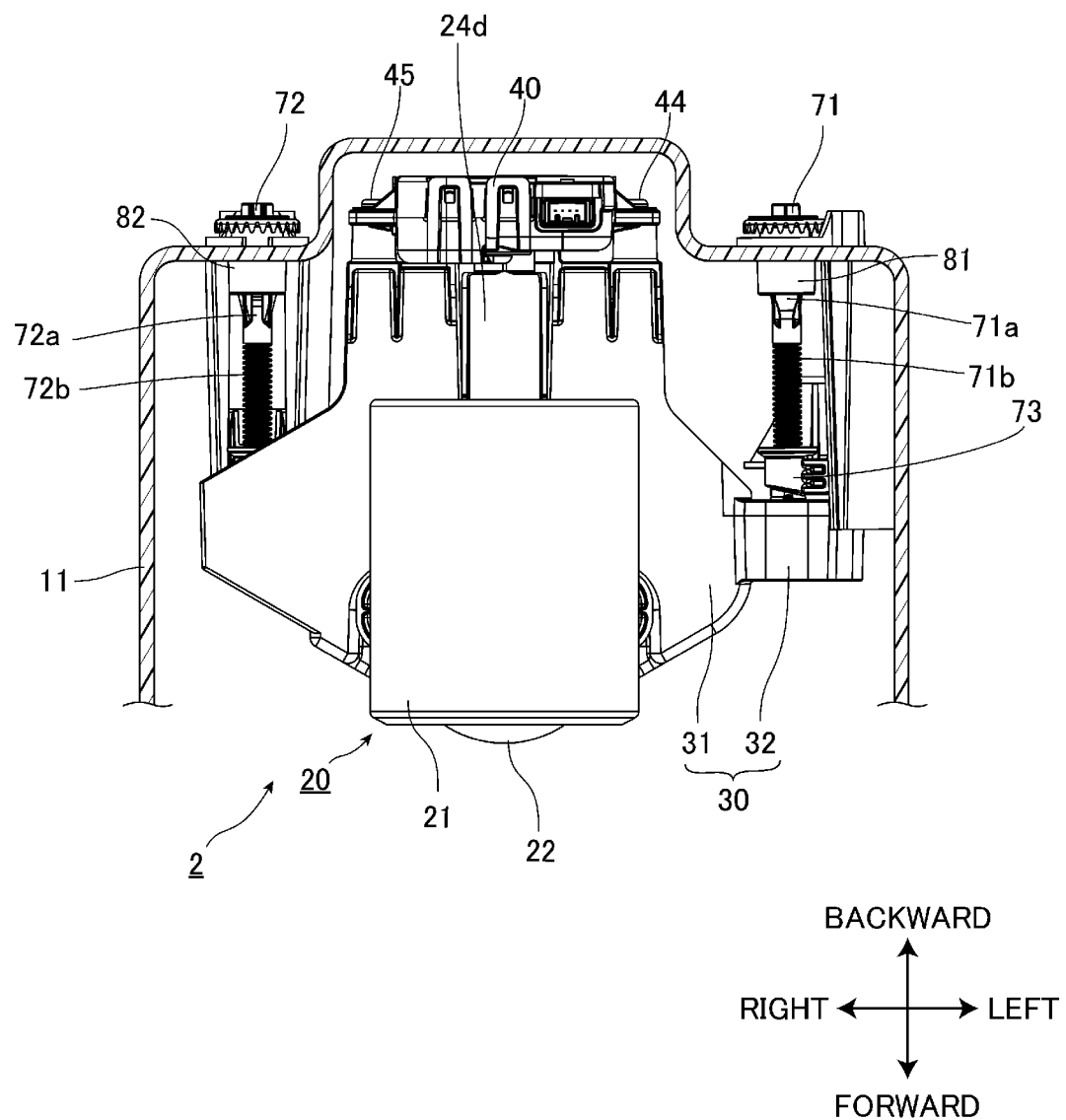
FIG. 4 is a plan view of the movable lamp-fitting unit illustrated in FIG. 1.
Figure 5:
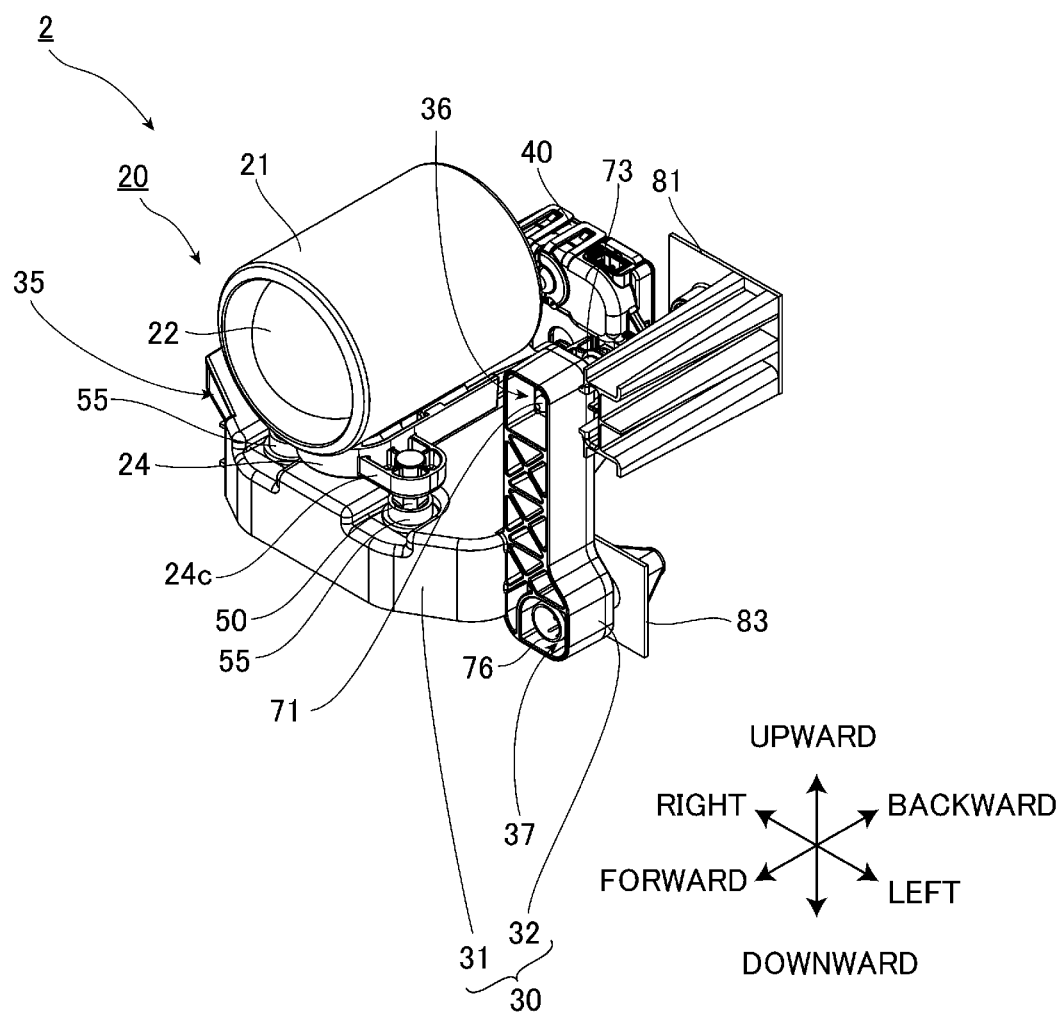
FIG. 5 is a perspective view of the movable lamp-fitting unit illustrated in FIG. 1.
Figure 6:
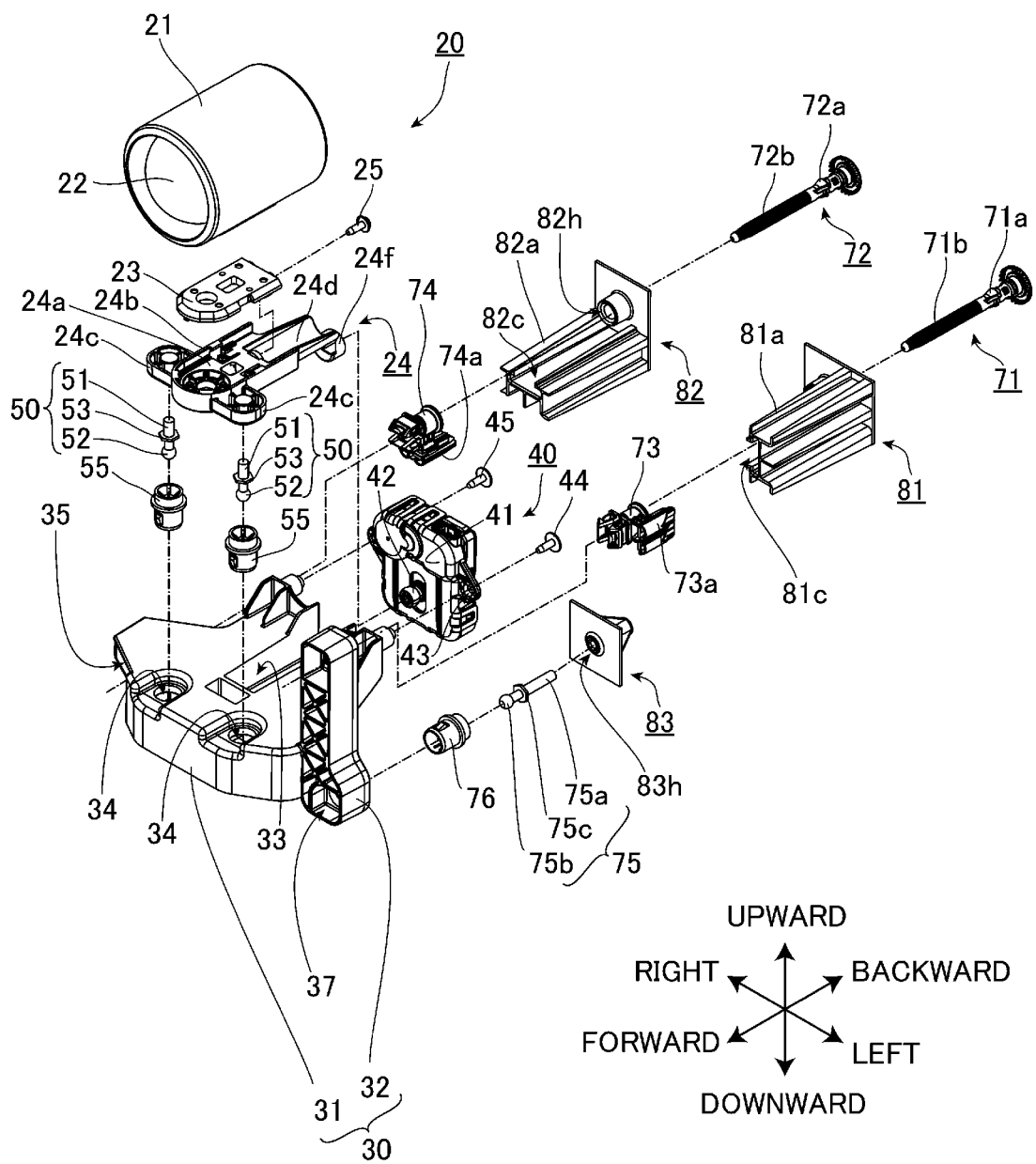
FIG. 6 is an exploded perspective view of the movable lamp-fitting unit illustrated in FIG. 1.

FIG. 3 is a sectional view taken along line III-III of the movable lamp-fitting unit 2 illustrated in FIG. 1. FIG. 4 is a plan view of the movable lamp-fitting unit 2 illustrated in FIG. 1. FIG. 4 illustrates part of the lamp housing 11 in horizontal section without any member disposed in front of the movable lamp-fitting unit 2. FIG. 5 is a perspective view of the movable lamp-fitting unit 2 illustrated in FIG. 1. FIG. 6 is an exploded perspective view of the movable lamp-fitting unit 2 illustrated in FIG. 1.

The movable lamp-fitting unit 2 includes, as main constituents, a lamp unit 20, the bracket 30, the actuator 40, a fulcrum member 50, and an optical-axis adjustment mechanism 70.

The bracket 30 includes a main portion 31 extending in the left and right direction and in the forward and backward direction, and an erect portion 32 extending in the upward and downward direction at the left end of the main portion 31. No bracket 30 is formed above the lamp unit 20. A cut-away portion 33 penetrating in the upward and downward direction is formed at substantially the center in the left and right direction of the main portion 31. The cut-away portion 33 is formed from the rear end of the main portion 31 to a portion in front of the center of the main portion 31. Two holes 34 open upward are formed side by side at left and right in front of the cut-away portion 33 in the main portion 31. A through hole 35 penetrating in the forward and backward direction is formed on the opposite side to the side on which the erect portion is provided, in the main portion 31, namely, at the right end of the main portion 31 according to the present embodiment. Through holes 36 and 37 penetrating in the forward and backward direction are formed, respectively, at the upper portion and the lower portion of the erect portion 32.

The lamp unit 20 is disposed above the main portion 31 of the bracket 30. The lamp unit 20 includes, as main constituents, the lamp body 21 in which a light source not illustrated is housed, a projection lens 22, a pedestal 23, and a joint 24.

The lamp body 21 that is cylindrical, has a bottom at the back. The front opening of the lamp body 21 is covered with the projection lens 22. Light emitted from the light source housed in the lamp body 21, radiates forward in a desired light-distribution pattern through the projection lens 22.

The joint 24 includes a main portion 24a, a side-wall portion 24b erecting upward from the outer circumference of the main portion 24a, and ear portions 24c protruding left and right outside the side-wall portion 24b. As illustrated in FIG. 6, the main portion 24a includes a rear portion 24d hollow downward, at the back. FIG. 2 illustrates the rear portion 24d in vertical section. As illustrated in FIG. 2, a screw hole 24e for screwing with a screw 25 to be described later is formed at the front end of the rear portion 24d, and a connector 24f extending downward is formed at the rear end of the rear portion 24d. The connector 24f has an opening at the back. A movable shaft 42 to be described later is inserted from the opening. A hole not illustrated open downward with a bottom at the top is formed at each ear portion 24c of the joint 24 illustrated, for example, in FIG. 6. An end portion of the fulcrum member 50 to be described later is inserted in the hole.

The pedestal 23 formed generally in a tabular shape is secured to the lower portion of the lamp body 21 with, for example, screws not illustrated. The outer circumference of the pedestal 23 has respective recesses formed left and right. The recesses engage with respective protrusions formed on the inner circumferential side of the side-wall portion 24b. A through hole not illustrated is formed at the rear end of the pedestal 23. The through hole overlaps the back of the screw hole 24e formed at the main portion 24a of the joint 24. The screw 25 is inserted in the through hole from the back. Then, the screw 25 screws with the screw hole 24e, resulting in integration of the pedestal 23 and the joint 24.

The actuator 40 is disposed behind the joint 24 and the bracket 30. The actuator 40 includes a casing 41, a motor not illustrated housed in the casing 41, and the movable shaft 42 protruding from an opening formed at the front of the casing 41 and extending forward. The movable shaft 42 according to the present embodiment extends horizontally in the forward and backward direction. The actuator 40 is capable of moving the movable shaft 42 in the upward and downward direction with the motor not illustrated. The outer circumferential portion of the casing 41 of the actuator 40 has respective screw holes 43 formed left and right. Screws 44 and 45 through the screw holes 43 screw with screw holes not illustrated formed at the back of the main portion 31 of the bracket 30, so that the actuator 40 is secured to the bracket 30. The movable shaft 42 is connected to the connector 24f of the joint 24 by insertion. At least part of the connection between the joint 24 and the movable shaft 42 is housed in the cut-away portion 33 of the bracket 30 when the connection is located at the lowest level. That is, when the movable shaft 42 is located at the lowest level, at least part of the movable shaft 42 and the connector 24f is housed in the cut-away portion 33 of the bracket 30.

The movable lamp-fitting unit 2 according to the present embodiment includes two fulcrum members 50 side by side in the left and right direction. Each fulcrum member 50 includes a rod-shaped main portion 51 extending in the upward and downward direction, a substantially spherical pivot 52 formed at the lower end of the main portion 51, and a collar portion 53 protruding outward from the outer circumferential face at substantially the center in the upward and downward direction of the main portion 51. The pivots 52 are secured to respective bearings 55. The bearings 55 are secured, by insertion, to the respective holes 34 of the bracket 30. Meanwhile, the respective upper ends of the fulcrum members 50 are inserted in the holes not illustrated formed at the ear portions 24c of the joint 24, so that the ear portions 24c are disposed on the respective collar portions 53. In this manner, the joint 24 is secured to the bracket 30 through the fulcrum members 50. Because the fulcrum members 50 include the respective pivots 52 as above, the joint 24 is pivotable on the pivots 52 as fulcrums to the bracket 30. That is the lamp unit 20 is pivotable on the pivots 52 as fulcrums to the bracket 30.

The optical-axis adjustment mechanism 70 according to the present embodiment includes, as main constituents, a first adjusting screw 71, a first self-locking nut 73, a second adjusting screw 72, a second self-locking nut 74, a fulcrum member 75, and a fulcrum bearing 76.

As illustrated in FIG. 6, the first adjusting screw 71 includes a snap-fit portion 71a and a screw portion 71b formed in front of the snap-fit portion 71a. A securing portion 81 illustrated in FIGS. 5 and 6 is part of the lamp housing 11, and is cut out for easy understanding of a method of securing the first adjusting screw 71. As illustrated in FIG. 3, a through hole 81h penetrating in the forward and backward direction is formed at the securing portion 81. The first adjusting screw 71 is inserted in the through hole 81h from the back. The insertion of the first adjusting screw 71 in the through hole 81h from the back, causes the snap-fit portion 71a to hook on the face inside the lamp housing 11. Thus, the first adjusting screw 71 is secured, rotatably around the axis thereof, to the casing 10. As illustrated in FIG. 6, a guide portion 81a extending in the longitudinal direction of the first adjusting screw 71, is formed at the securing portion 81. A C-shaped portion 81c having a C shape in longitudinally vertical section, is formed on the side on which the first adjusting screw 71 is disposed, in the guide portion 81a. The C-shaped portion 81c is open on the side on which the first adjusting screw 71 is disposed. The screw portion 71b of the first adjusting screw 71 is inserted in the first self-locking nut 73, to screw with a female screw formed inside the first self-locking nut 73. The first self-locking nut 73 is inserted in the through hole 36 formed at the erect portion 32 of the bracket 30, so that the first self-locking nut 73 is secured to the bracket 30. A T-shaped portion 73a having a T shape in longitudinally vertical section to the first adjusting screw 71, is formed on the side on which the guide portion 81a is formed, in the first self-locking nut 73. The T-shaped portion 73a engages with the C-shaped portion 81c, so that the first self-locking nut 73 can move to the guide portion 81a relatively in the forward and backward direction. The rear end portion of the first adjusting screw 71 is exposed outside the casing 10. An operation of the rear end portion of the first adjusting screw 71 enables the first adjusting screw 71 to rotate around the axis. The rotation of the first adjusting screw 71 in that manner enables the first self-locking nut 73 screwing with the screw portion 71b of the first adjusting screw 71, to move in the forward and backward direction.

The second adjusting screw 72 has a configuration similar to that of the first adjusting screw 71. As illustrated in FIG. 6, the second adjusting screw 72 includes a snap-fit portion 72a and a screw portion 72b formed in front of the snap-fit portion 72a. A securing portion 82 illustrated in FIG. 6 is part of the lamp housing 11, and is cut out for easy understanding of a method of securing the second adjusting screw 72. The second adjusting screw 72 is inserted in a through hole 82h formed at the securing portion 82 in the lamp housing 11, from the back. The insertion of the second adjusting screw 72 in the through hole 82h from the back, causes the snap-fit portion 72a to hook on the face inside the lamp housing 11. Thus, the second adjusting screw 72 is secured, rotatably around the axis thereof, to the casing 10. A guide portion 82a extending in the longitudinal direction of the second adjusting screw 72, is formed at the securing portion 82. A C-shaped portion 82c having a C shape in longitudinally vertical section, is formed on the side on which the second adjusting screw 72 is disposed, in the guide portion 82a. The C-shaped portion 82c is open on the side on which the second adjusting screw 72 is disposed. The screw portion 72b of the second adjusting screw 72 is inserted in the second self-locking nut 74, to screw with a female screw formed inside the second self-locking nut 74. The second self-locking nut 74 is inserted in the through hole 35 formed at the main portion 31 of the bracket 30, so that the second self-locking nut 74 is secured to the bracket 30. A T-shaped portion 74a having a T shape in longitudinally vertical section to the second adjusting screw 72, is formed on the side on which the guide portion 82a is formed, in the second self-locking nut 74. The T-shaped portion 74a engages with the C-shaped portion 82c, so that the second self-locking nut 74 can move to the guide portion 82a relatively in the forward and backward direction. The rear end portion of the second adjusting screw 72 is exposed outside the casing 10. An operation of the rear end portion of the second adjusting screw 72 enables the second adjusting screw 72 to rotate around the axis. The rotation of the second adjusting screw 72 in that manner enables the second self-locking nut 74 screwing with the screw portion 72b of the second adjusting screw 72, to move in the forward and backward direction.

The fulcrum member 75 includes a rod-shaped main portion 75a extending the forward and backward direction, a substantially spherical pivot 75b formed at the front end of the main portion 75a, and a collar portion 75c protruding outward from the outer circumferential face at substantially the center in the forward and backward direction of the main portion 75a. The pivot 75b is secured to the fulcrum bearing 76. The fulcrum bearing 76 is secured, by insertion, to the through hole 37 formed at the erect portion 32 of the bracket 30. The pivot 75b at the leading end of the fulcrum member 75 is secured in that manner, so that the fulcrum member 75 is secured, pivotably on the pivot 75b as the base, to the bracket 30. Meanwhile, the rear end of the fulcrum member 75 secured to the casing 10 through a securing portion 83. The securing portion 83 illustrated in FIGS. 5 and 6 is part of the lamp housing 11, and is cut out for easy understanding of a method of securing the fulcrum member 75. A hole 83h hollow backward is formed at the securing portion 83. The rear end of the fulcrum member 75 is inserted in the hole 83h, so that the collar portion 75c of the fulcrum member 75 overlaps the opening edge of the hole 83h.

As described above, part of the optical-axis adjustment mechanism 70 according to the present embodiment is mounted on the erect portion 32 of the bracket 30 and other part is mounted on the main portion 31 of the bracket 30.

Next, the operation and functional effect of the vehicle headlight 1 according to the present embodiment will be described.

Figure 7A:
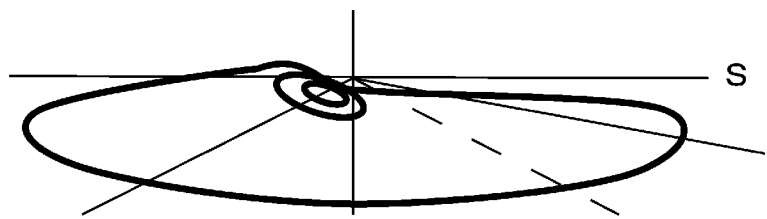
FIG. 7A illustrates the light distribution of a low beam.
Figure 7B:
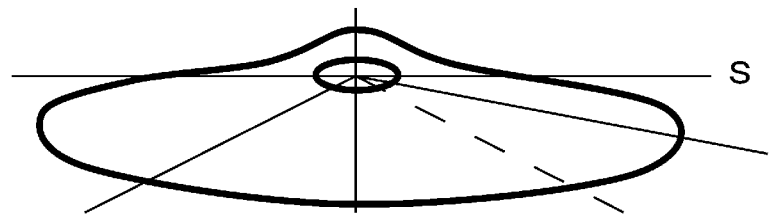
FIG. 7B illustrates the light distribution of a high beam.

The vehicle headlight 1 according to the present embodiment can form a desired light-distribution pattern with the lamp unit 20. For a low beam, the vehicle headlight 1 is capable of forming the light distribution pattern of a low beam illustrated in FIG. 7A. For a high beam, the vehicle headlight 1 is capable of forming the light distribution pattern of a high beam illustrated in FIG. 7B.

The direction of the optical axis of the lamp unit 20 is adjusted as described below. In the vehicle headlight 1, as above, the joint 24 is connected to the bracket 30 by the fulcrum members 50 such that the joint 24 is pivotable to the bracket 30. The movable shaft 42 of the actuator 40 is connected to the joint 24 on the rear side of the fulcrum members 50. Therefore, movement of the movable shaft 42 in the upward and downward direction by the motor of the actuator 40, causes the rear portion of the joint 24 to pivot on the pivots 52 at the leading ends of the fulcrum members 50 as fulcrums in the upward and downward direction. Thus, the rear portion of the lamp body 21 secured to the joint 24 pivots in the upward and downward direction, so that the radiation direction of light from the light source housed in the lamp body 21 can be adjusted in the upward and downward direction. That is the optical axis of the lamp unit 20 is adjusted in the upward and downward direction.

Because the rear end portion of the screw portion 71b of the first adjusting screw 71 is exposed outside the casing 10 as above, the screw portion 71b can rotate around the axis thereof due to an operation from outside the casing 10. Rotation of the screw portion 71b around the axis causes the first self-locking nut 73 screwing with the screw portion 71b, to move to the casing 10 relatively in the forward and backward direction. The first self-locking nut 73 is secured to the upper portion of the erect portion 32, and the fulcrum member 75 is secured, pivotably to the bracket 30, to the lower portion of the erect portion 32. Therefore, movement of the first self-locking nut 73 in the forward and backward direction causes the bracket 30 to pivot on the pivot 75b at the leading end of the fulcrum member 75 as the base in the forward and backward direction in a vertical plane, so that the optical axis of the lamp unit 20 is adjusted in the upward and downward direction.

Because the rear end portion of the screw portion 72b of the second adjusting screw 72 is exposed outside the casing 10 as above, the screw portion 72b can rotate around the axis thereof due to an operation form outside the casing 10. Rotation of the screw portion 72b around the axis causes the second self-locking nut 74 screwing with the screw portion 72b, to move to the casing 10 relatively in the forward and backward direction. The second self-locking nut 74 is secured to the right end of the main portion 31, and the fulcrum member 75 is secured, pivotably to the bracket 30, to the erect portion 32 formed at the left end of the main portion 31. Therefore, movement of the second self-locking nut 74 in the forward and backward direction causes the bracket 30 to pivot on the pivot 75b at the leading end of the fulcrum member 75 as the base in the forward and backward direction in a horizontal plane, so that the optical axis of the lamp unit 20 is adjusted in the left and right direction.

Here, in the vehicle lamp fitting described in Patent Literature 1 above, the actuator is disposed below the lamp unit, and additionally part of the bracket is disposed above the lamp unit. Therefore, the vehicle lamp fitting described in Patent Literature 1 above tends to be large in thickness in the upward and downward direction. Meanwhile, the vehicle headlight 1 according to the present embodiment is reduced in thickness as described below.

The actuator 40 and the optical-axis adjustment mechanism 70 that adjust the optical axis of the lamp unit 20, are disposed behind the joint 24. Therefore, the vehicle headlight 1 is reduced in thickness in the upward and downward direction. The bracket 30 included in the vehicle headlight 1 includes the main portion 31 extending in the left and right direction and the erect portion 32 extending in the upward and downward direction. As above, no bracket 30 can be formed above the lamp body 21. Therefore, the vehicle headlight 1 is further reduced in thickness. No bracket 30 is formed above the lamp body 21 in that manner, so that the upper portion of the lamp body 21 can be viewed from the front of the vehicle headlight 1. Thus, the vehicle headlight 1 improves in design.

As above, the bracket 30 includes the cut-away portion 33 at the back, and at least part of the connection between the joint 24 and the movable shaft 42 is housed in the cut-away portion 33 when the connection is located at the lowest level. The formation of the cut-away portion 33 in the bracket 30 and the arrangement of the joint 24 and the movable shaft 42 in that manner, cause the vehicle headlight 1 to be further reduced in thickness. From the viewpoint of further reduction in the thickness of the vehicle headlight 1, when the connection between the joint 24 and the movable shaft 42 is located at the lowest level, preferably, the entirety of the connection is housed in the cut-away portion 33.

The plurality of fulcrum members 50 is provided side by side in the left and right direction as above, so that the joint 24 improves in stability. Thus, the emission direction of light from the light source housed in the lamp body 21 is inhibited from deviating.

The movable shaft 42 extends horizontally in the forward and backward direction, so that power is transmitted properly easily from the movable shaft 42 to the joint 24.

Second Embodiment

Next, a second embodiment of the present invention will be described in detail with reference to the drawings.

Figure 8:
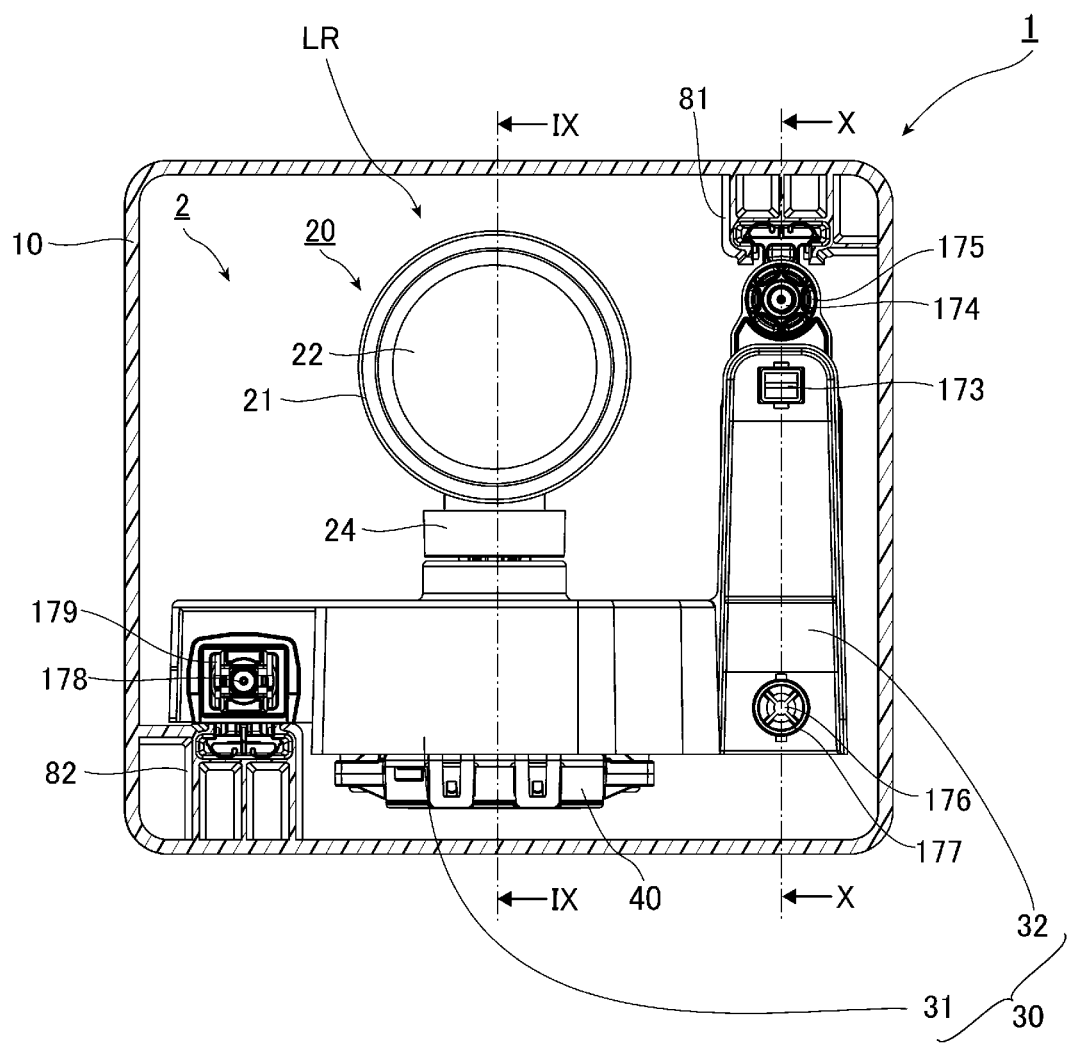
FIG. 8 is a front view of a vehicle lamp fitting according to a second embodiment of the present invention.
Figure 8:
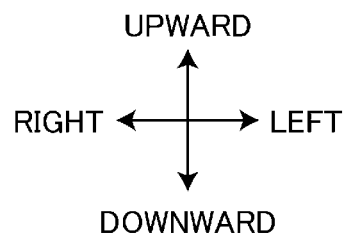
Figure 9:
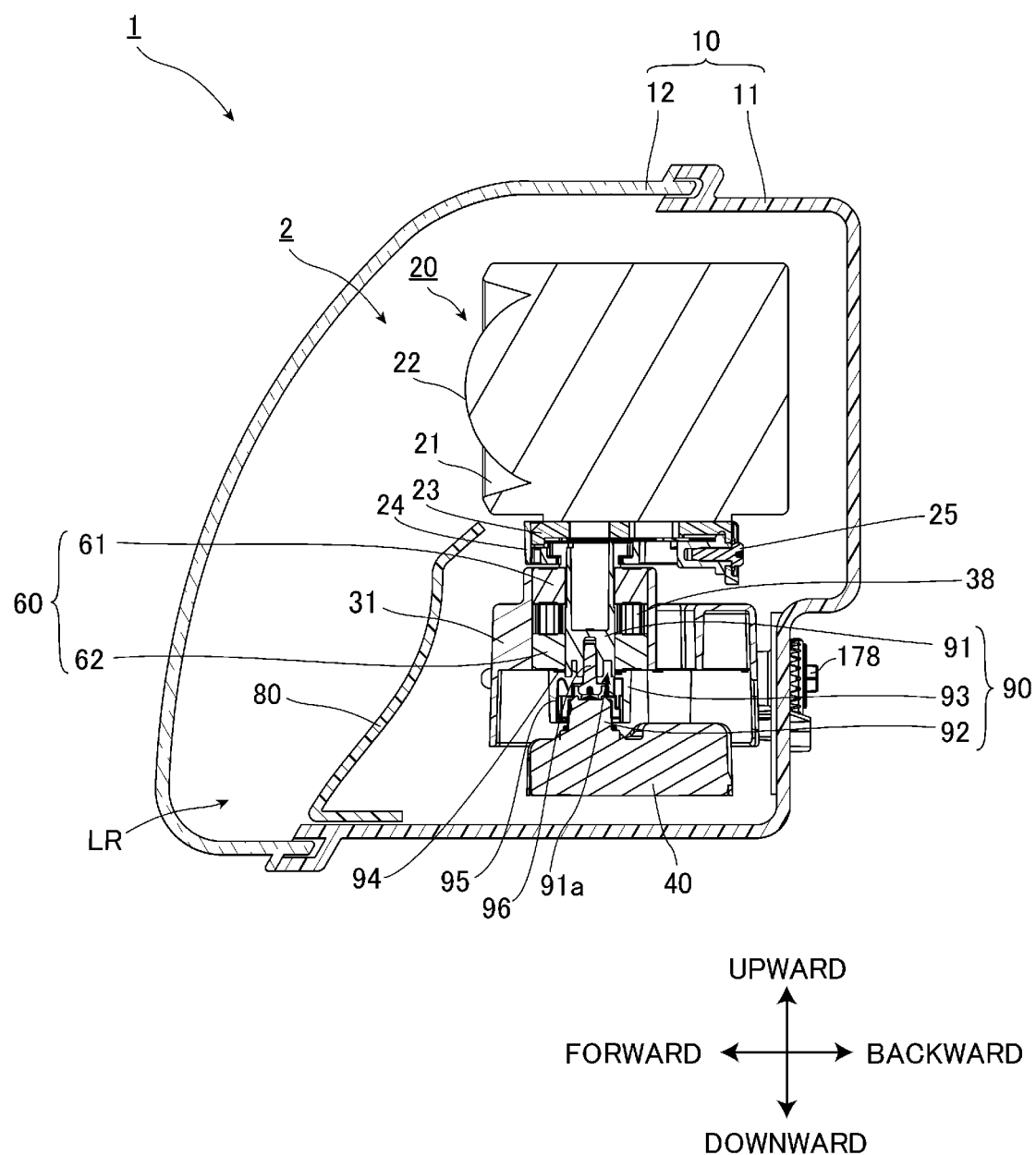
FIG. 9 is a sectional view taken along line IX-IX of the vehicle lamp fitting illustrated in FIG. 8.
Figure 10:
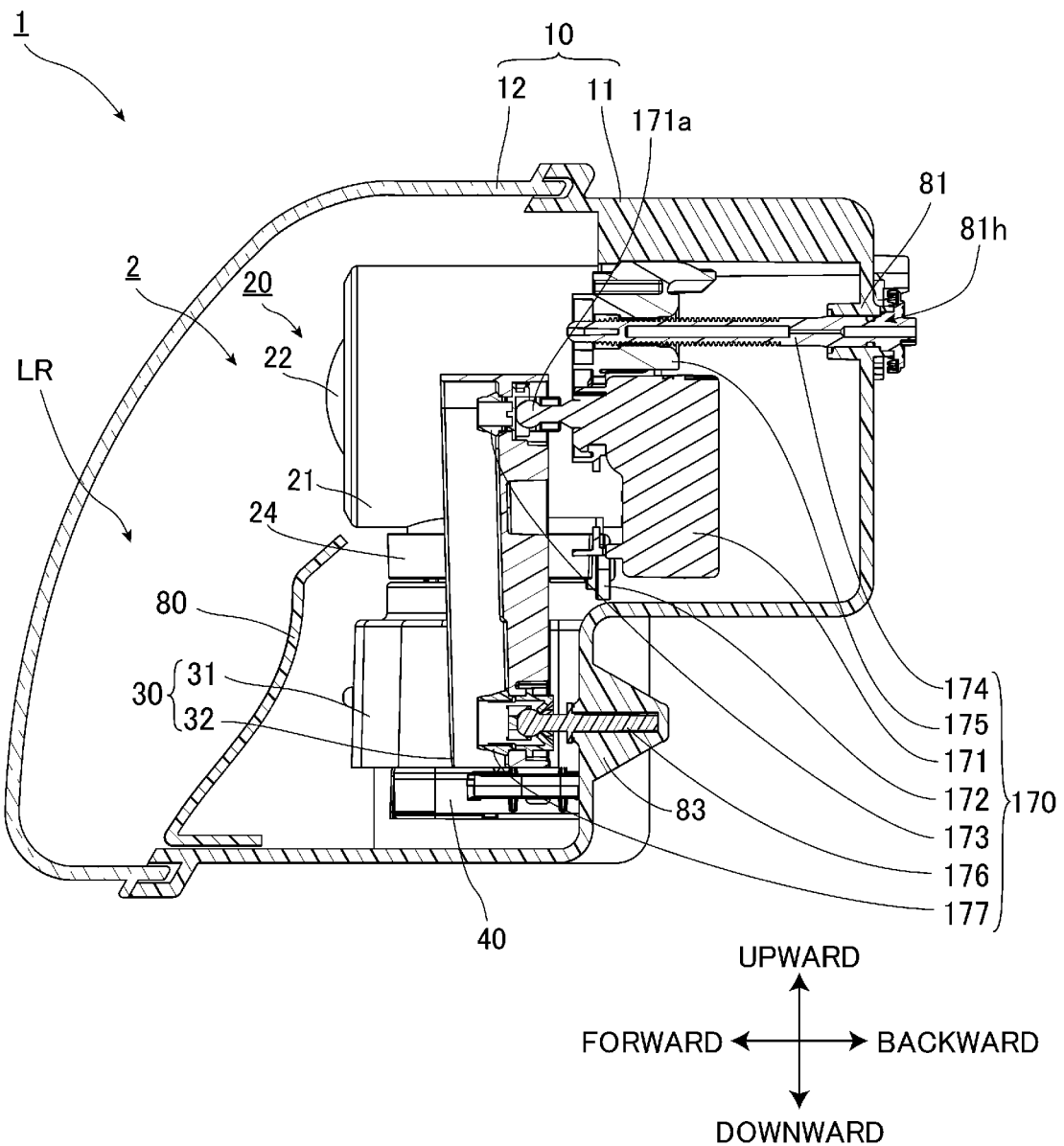
FIG. 10 is a sectional view taken along line X-X of the vehicle lamp fitting illustrated in FIG. 8.

FIG. 8 is a front view of a vehicle lamp fitting according to the second embodiment of the present invention. FIG. 9 is a sectional view taken along line IX-IX of the vehicle lamp fitting illustrated in FIG. 8. FIG. 10 is a sectional view taken along line X-X of the vehicle lamp fitting illustrated in FIG. 8. Note that, for easy understanding of the configuration of the vehicle lamp fitting, FIG. 8 illustrates part of a casing 10 in vertical section without any member disposed in front of a movable lamp-fitting unit 2. FIG. 9 illustrates a lamp body 21 and an actuator 40 by hatching without illustrating the inside of the lamp body 21 and the internal structure of the actuator 40. FIG. 10 illustrates an actuator 171 by hatching without illustrating the internal structure thereof. Note that left and right, forward and backward, and upward and downward directions in FIGS. 8 to 11 and other figures below are based on the eye point of an occupant in a vehicle as indicated in each figure.

The vehicle lamp fitting according to the present embodiment is a vehicle headlight 1. As illustrated in FIGS. 8 to 11, the vehicle headlight 1 includes, as main constituents, the movable lamp-fitting unit 2, a bezel 80, and the casing 10 housing the movable lamp-fitting unit 2 and the bezel 80, the movable lamp-fitting unit 2 including a lamp unit 20, a bracket 30, the actuator 40, an aligning member 60, and an optical-axis adjustment mechanism 170.

The casing 10 includes, as main constituents, a lamp housing 11 and a front cover 12. The lamp housing 11 has an opening at the front thereof, and the front cover 12 is secured to the lamp housing 11 such that the opening is covered. A space formed by the lamp housing 11 and the front cover 12 covering the front opening of the lamp housing 11, results in a light room LR. The movable lamp-fitting unit 2 and the bezel 80 are housed in the light room LR.

The bezel 80 is disposed below the lamp unit 20 in the front view of the vehicle headlight 1. The bezel 80 disposed in front of the bracket 30 and the actuator 40, conceals the bracket 30 and the actuator 40 from the front of the vehicle headlight 1.

Figure 11:
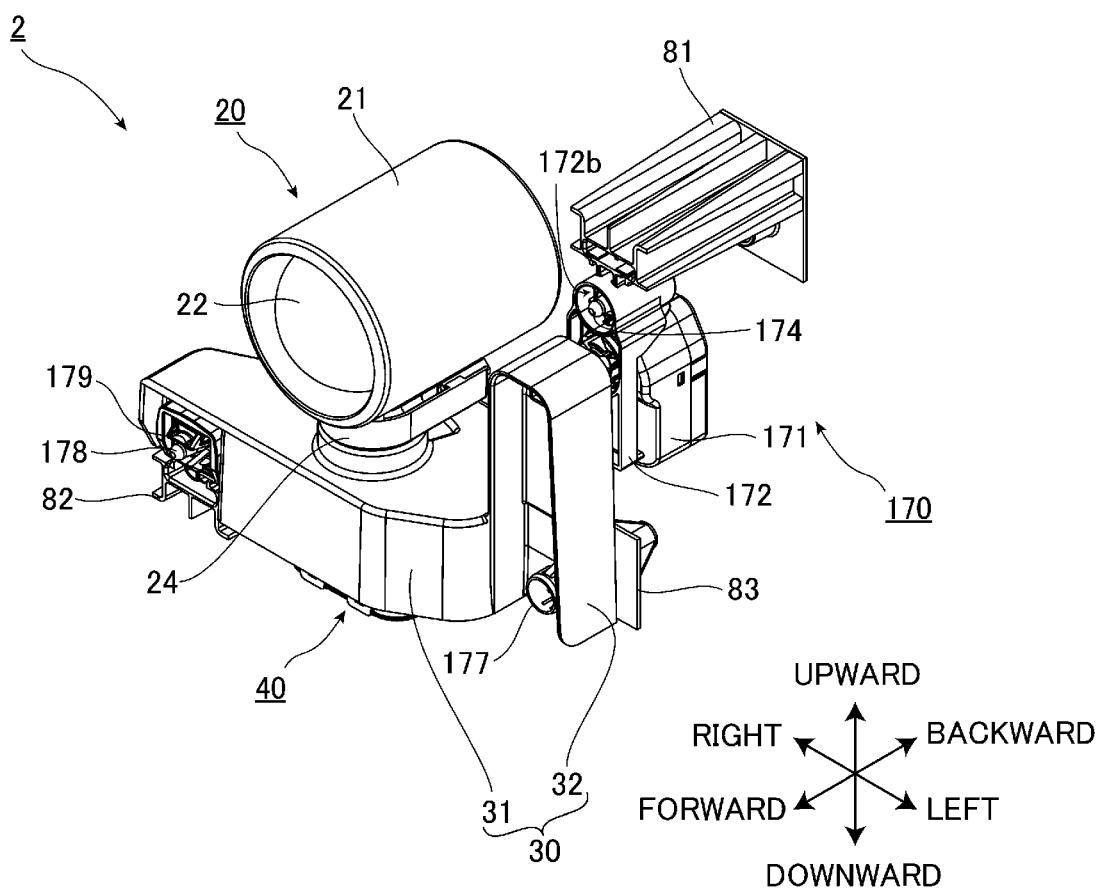
FIG. 11 is a perspective view of a movable lamp-fitting unit illustrated in FIG. 8.
Figure 12:
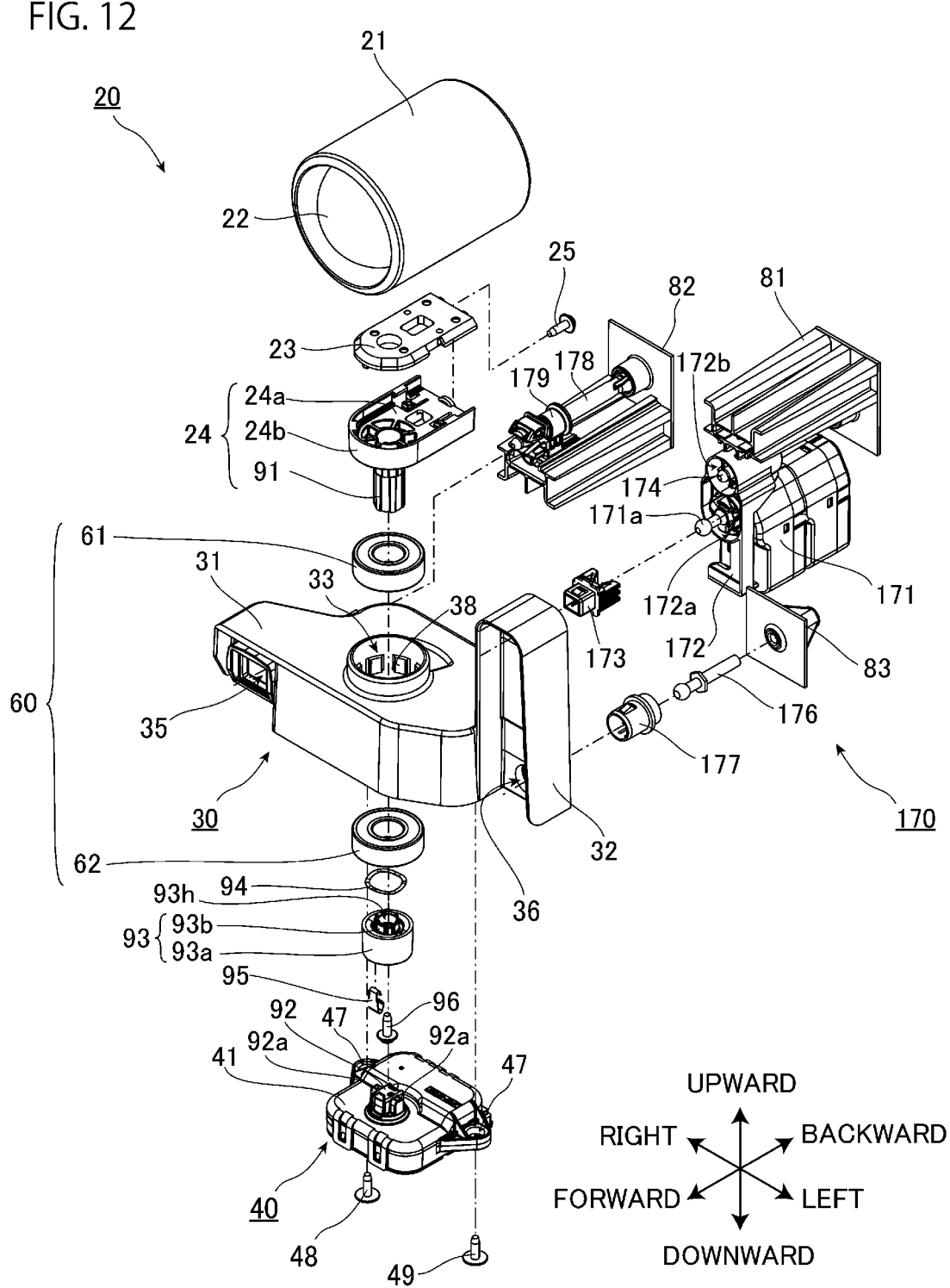
FIG. 12 is an exploded perspective view of the movable lamp-fitting unit illustrated in FIG. 11.
Figure 13:
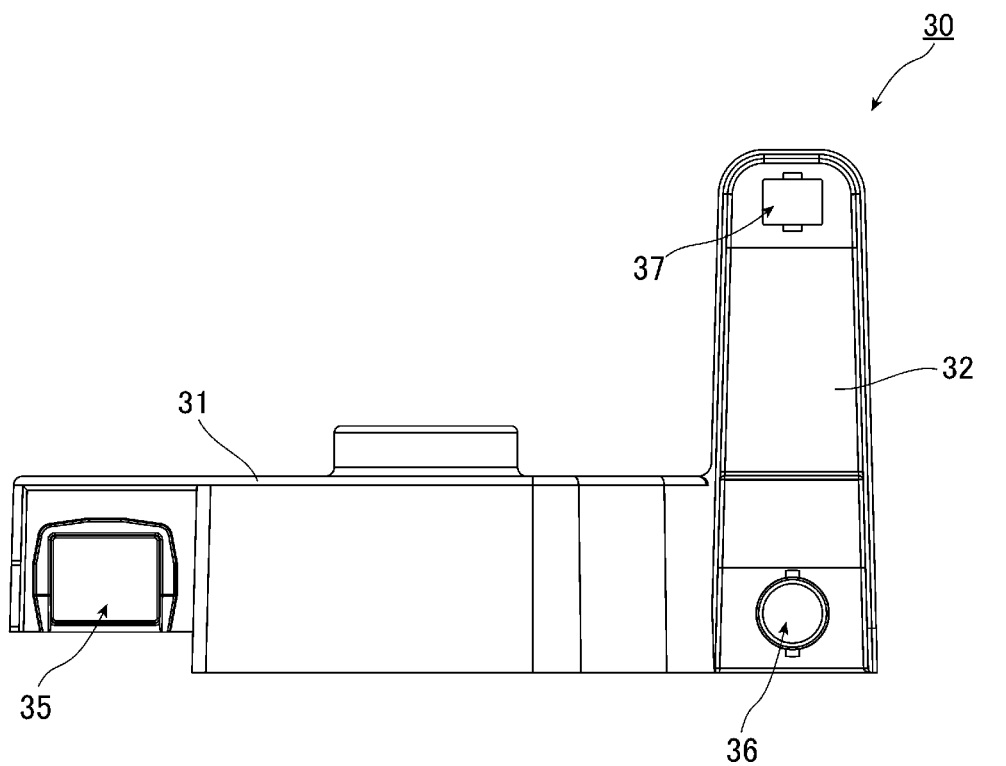
FIG. 13 is a front view of a bracket illustrated in FIG. 8.
Figure 13:
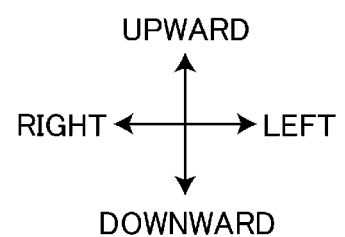

FIG. 11 is a perspective view of the movable lamp-fitting unit 2 illustrated in FIG. 8. FIG. 12 is an exploded perspective view of the movable lamp-fitting unit 2 illustrated in FIG. 11. FIG. 13 is a front view of the bracket 30.

The bracket 30 includes a main portion 31 extending in the left and right direction and an erect portion 32 extending in the upward and downward direction at the left end of the main portion 31. No bracket 30 is formed above the lamp unit 20. A through hole 33 penetrating in the upward and downward direction, is formed at substantially the center portion of the main portion 31. A plurality of spacers 38 protruding inward is formed at substantially the center in the upward and downward direction of the inner circumferential face of the through hole 33. A through hole 35 penetrating in the forward and backward direction is formed on the opposite side to the side on which the erect portion 32 is provided, in the main portion 31, namely, at the right end of the main portion 31 according to the present embodiment. Through holes 36 and 37 penetrating in the forward and backward direction are formed, respectively, at the upper portion and the lower portion of the erect portion 32.

The lamp unit 20 is disposed above the main portion 31 of the bracket 30. The lamp unit 20 includes, as main constituents, the lamp body 21 housing a light source not illustrated, a projection lens 22 covering the front opening of the lamp body 21, a pedestal 23 secured to the lower portion of the lamp body 21, and a joint 24 secured to the pedestal 23. Light emitted from the light source housed in the lamp body 21, radiates in a desired light-distribution pattern through the projection lens 22. The joint 24 includes a tabular main portion 24a, a side-wall portion 24b erecting upward from the outer circumference of the main portion 24a, and a first shaft 91 extending downward from the main portion 24a. The pedestal 23 that is generally tabular is secured to the lower portion of the lamp body 21 with, for example, screws not illustrated. The outer circumferential portion of the pedestal 23 engages with the inner circumferential face of the side-wall portion 24b and additionally a screw 25 inserted from the back of the pedestal 23 screws with the back of the main portion 24a of the joint 24, resulting in integration of the pedestal 23 and the joint 24. In this manner, the lamp unit 20 includes the first shaft 91 extending downward, with the joint 24 integrated.

The actuator 40 is disposed below the main portion 31 of the bracket 30. The actuator 40 includes a casing 41, a motor not illustrated housed in the casing 41, and a second shaft 92 protruding from an opening formed at the upper portion of the casing 41 and extending upward. The actuator 40 is capable of rotating the second shaft 92 around the axis thereof with the motor not illustrated. The outer circumferential portion of the casing 41 of the actuator 40 has respective screw holes 47 formed left and right. Screws 48 and 49 through the screw holes 47 screw with screw holes not illustrated formed on the lower side of the main portion 31 of the bracket 30, so that the actuator 40 is secured to the bracket 30.

The aligning member 60 according to the present embodiment includes a pair of bearing made of a first bearing 61 and a second bearing 62. The aligning member 60 secured to the main portion 31 of the bracket 30, holds a rotary shaft 90 including the first shaft 91 and the second shaft 92 coupled, rotatably. Specifically, the first bearing 61 and the second bearing 62 each are a ball bearing. The respective outer circumferential faces of the first bearing 61 and the second bearing 62 are secured in contact with the inner circumferential face of the through hole 33 formed at the main portion 31 of the bracket 30. The first bearing 61 inserted in the through hole 33 from above, is disposed on the spacers 38. The second bearing 62 inserted in the through hole 33 from below, is disposed between the spacers 38 and a joint 93 to be described later. The rotary shaft 90 is inserted on the respective inner circumferential face sides of the first bearing 61 and the second bearing 62.

As illustrated in FIGS. 9 and 12, the rotary shaft 90 includes the first shaft 91 and the second shaft 92 coupled through the joint 93. The joint 93 includes a bottomed cylindrical main portion 93a having a bottom on the upper side, and a cylindrical protruding portion 93b extending upward from the bottom of the main portion 93a. A through hole 93h is formed at the center of the bottom of the main portion 93a. The protruding portion 93b is formed surrounding the through hole 93h. As illustrated in FIG. 9, an annular groove 91a is formed on the lower side of the first shaft 91, and the protruding portion 93b of the joint 93 engages with the groove 91a. A screw 96 inserted in the through hole 93h of the joint 93 from below, screws with the first shaft 91, so that the joint 93 and the first shaft 91 are secured together. Meanwhile, the second shaft 92 is inserted in the main portion 93a of the joint 93 from below. As illustrated in FIG. 12, the second shaft 92 includes a pair of protrusions 92a on the outer circumference thereof. The protrusions 92a engage with a recess not illustrated formed on the inner circumferential face of the main portion 93a of the joint 93. Thus, the joint 93 rotates together with the second shaft 92. Insertion of a spring 95 between the outer circumferential face of the second shaft 92 and the inner circumferential face of the main portion 93a, causes the joint 93 to be inhibited from backlashing at rotation of the second shaft 92. In this manner, the first shaft 91 and the second shaft 92 are secured indirectly, resulting in formation of the rotary shaft 90.

As illustrated in FIG. 9, according to the present embodiment, the first shaft 91 of the rotary shaft 90 is inserted through the first bearing 61 and the second bearing 62. The inner diameters of the first bearing 61 and the second bearing 62 are substantially the same as the outer diameter of the first shaft 91. The joint 93 is larger in outer diameter than the first shaft 91. The second bearing 62 is disposed on the upper side of the main portion 93a of the joint 93 through a washer 94.

As illustrated in FIGS. 10 to 12, the optical-axis adjustment mechanism 170 according to the present embodiment includes, as main constituents, the actuator 171, a joint 172, an actuator bearing 173, a first adjusting screw 174, a first self-locking nut 175, a fulcrum member 176, a fulcrum bearing 177, a second adjusting screw 178, and a second self-locking nut 179.

The actuator 171 includes a shaft portion 171a extending in the forward and backward direction. The actuator 171 including a motor not illustrated, is capable of moving the shaft portion 171a in the forward and backward direction with the motor. The joint 172 has two through holes 172a and 172b penetrating in the forward and backward direction. The actuator 171 and the joint 172 are secured mutually. The shaft portion 171a of the actuator 171 is inserted through the through hole 172a on the lower side of the joint 172 having the two through holes 172a and 172b. The leading end of the shaft portion 171a is secured to the actuator bearing 173. The actuator bearing 173 is secured to the through hole 37 formed at the erect portion of the bracket 30. The shaft portion 171a of the actuator 171 has a leading end formed in a generally spherical shape. The shaft portion 171a is secured, pivotably to the bracket 30, to the actuator bearing 173.

The first adjusting screw 174 is secured to the casing 10 through a securing portion 81. As illustrated in FIGS. 8 and 10, the securing portion 81 is part of the lamp housing 11. FIGS. 11 and 12 illustrate the securing portion 81 cut out for easy understanding of a method of securing the first adjusting screw 174. As illustrated in FIG. 10, a through hole 81h penetrating in the forward and backward direction, is formed at the securing portion 81. The first adjusting screw 174 is inserted in the through hole 81h from the back. The first adjusting screw 174 is secured, rotatably around the axis thereof, to the casing 10. The rear end portion of the first adjusting screw 174 is exposed outside the casing 10. Meanwhile, a screw thread is formed at part of the front of the first adjusting screw 174. As illustrated in FIG. 3, the first adjusting screw 174 screws with the first self-locking nut 175. The first self-locking nut 175 is secured to the through hole 172b formed at the joint 172.

One end portion of the fulcrum member 176 is inserted in a hole formed at a securing portion 83, and is secured to the casing 10. As illustrated in FIG. 10, the securing portion 83 is part of the lamp housing 11. FIGS. 11 and 12 illustrate the securing portion 83 cut out for easy understanding of a method of securing the fulcrum member 176. The other end portion of the fulcrum member 176 is secured to the fulcrum bearing 177. The fulcrum bearing 177 is secured to the through hole 36 formed at the erect portion 32 of the bracket 30. The leading end on the side for securing to the fulcrum bearing 177, in the fulcrum member 176, is formed in a generally spherical shape. The fulcrum member 176 is secured, pivotably to the bracket 30, to the fulcrum bearing 177.

The second adjusting screw 178 has a configuration similar to that of the first adjusting screw 174. The second adjusting screw 178 is secured to the casing 10 through a securing portion 82. As illustrated in FIG. 8, the securing portion 82 is part of the lamp housing 11. FIGS. 11 and 12 illustrate the securing portion 82 cut out for easy understanding of a method of securing the second adjusting screw 178. The securing portion 82 has a configuration similar to that of the securing portion 81. A through hole penetrating in the forward and backward direction, is formed at the securing portion 82. The second adjusting screw 178 is inserted in the through hole from the back. The second adjusting screw 178 is secured, rotatably around the axis thereof, to the casing 10. The rear end portion of the second adjusting screw 178 is exposed outside the casing 10. Meanwhile, a screw thread is formed at part of the front of the second adjusting screw 178. The second adjusting screw 178 screws with the second self-locking nut 179. The second self-locking nut 179 is secured to the through hole 35 formed at the main portion 31 of the bracket 30.

As described above, part of the optical-axis adjustment mechanism 170 according to the present embodiment is mounted on the erect portion 32 of the bracket 30 and other part is mounted on the main portion 31 of the bracket 30.

Next, the operation and functional effect of the vehicle headlight 1 according to the present embodiment will be described.

Figure 14A:
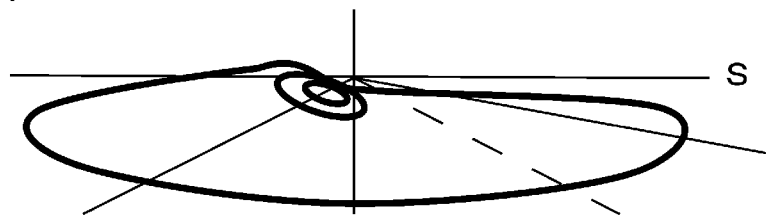
FIG. 14A illustrates the light distribution of a low beam.
Figure 14B:
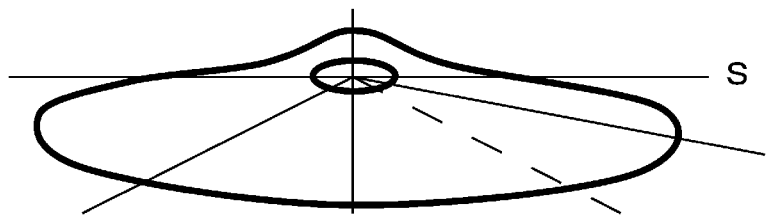
FIG. 14B illustrates the light distribution of a high beam.

The vehicle headlight 1 according to the present embodiment can form a desired light-distribution pattern with the lamp unit 20. For a low beam, the vehicle headlight 1 is capable of forming the light distribution pattern of a low beam illustrated in FIG. 14A. For a high beam, the vehicle headlight 1 is capable of forming the light distribution pattern of a high beam illustrated in FIG. 14B.

The direction of the optical axis of the lamp unit 20 is adjusted by the optical-axis adjustment mechanism 170 as described below. As above, the shaft portion 171a is secured to the actuator bearing 173. The actuator bearing 173 is secured to the upper portion of the erect portion 32. The leading end of the fulcrum member 176 is secured, pivotably to the bracket 30, to the lower portion of the erect portion 32. Therefore, movement of the shaft portion 171a in the forward and backward direction by the motor of the actuator 171, causes the bracket 30 to pivot on the leading end of the fulcrum member 176 as the base in the forward and backward direction in a vertical plane, so that the optical axis of the lamp unit 20 is adjusted in the upward and downward direction. Because the end portion of the first adjusting screw 174 is exposed outside the casing 10 as above, the first adjusting screw 174 can be rotated around the axis from outside the casing 10. Rotation of the first adjusting screw 174 around the axis causes the first self-locking nut 175 screwing with the first adjusting screw 174, to move to the casing 10 relatively in the forward and backward direction. Along with the movement of the first self-locking nut 175, the joint 172 to which the first self-locking nut 175 is secured and the actuator 171 secured to the joint 172 move in the forward and backward direction. The rotation of the first adjusting screw 174 around the axis in that manner causes the shaft portion 171a to move in the forward and backward direction, so that the optical axis of the lamp unit 20 is adjusted in the upward and downward direction as above. Because the end portion of the second adjusting screw 178 is exposed outside the casing 10 as above, the second adjusting screw 178 can be rotated around the axis from outside the casing 10. Rotation of the second adjusting screw 178 around the axis causes the second self-locking nut 179 screwing with the second adjusting screw 178, to move to the casing 10 relatively in the forward and backward direction. The movement of the second self-locking nut 179 in the forward and backward direction causes the bracket 30 to pivot on the leading end of the fulcrum member 176 as the base in the forward and backward direction in a horizontal plane, so that the optical axis of the lamp unit 20 is adjusted in the left and right direction.

Here, in the vehicle lamp fitting described in Patent Literature 1 above, because the supporting shaft provided at the upper portion of the lamp unit is secured to the bracket, part of the bracket is disposed on the upper portion of the lamp unit. Furthermore, a concealing member is provided such that the bracket is concealed in a case where the vehicle lamp fitting is viewed from the front. Therefore, in a case where the vehicle lamp fitting described in Patent Literature 1 above is viewed from the front, the periphery of the lamp unit is covered with the concealing member. However, from the viewpoint of improvement in design, there is a request that the upper portion of the lamp unit be made visible from the front of the vehicle lamp fitting. Meanwhile, the vehicle headlight 1 according to the present embodiment enables improvement in design as described below.

In the vehicle headlight 1 according to the present embodiment, the first shaft 91 of the lamp unit 20 is coupled with the second shaft 92 of the actuator 40. Thus, rotation of the second shaft 92 by the actuator 40 causes rotation of the lamp unit 20, so that the radiation direction of light from the lamp unit 20 can be changed in the left and right direction. That is the light-distribution pattern formed by the lamp unit 20 can be shifted in the left and right direction. The aligning member 60 holds the rotary shaft 90 including the first shaft 91 and the second shaft 92 coupled, so that the lamp unit 20 is inhibited from deviating at the rotation of the lamp unit 20 as above. In this manner, the lamp unit 20 is supported only from below the lamp unit 20, and no bracket is formed above the lamp unit 20. Thus, the upper portion of the lamp unit 20 can be viewed from the front of the vehicle headlight 1. Therefore, the vehicle headlight 1 improves in design.

In the vehicle headlight 1 according to the present embodiment, the aligning member 60 is a pair of bearings made of the first bearing 61 and the second bearing 62 disposed at a predetermined interval in the upward and downward direction. The pair of bearings disposed apart in the upward and downward direction in that manner holds the rotary shaft 90, so that the rotary shaft 90 is supported at two places mutually apart in the direction of the axis thereof. Thus, the rotary shaft 90 is further inhibited from deviating.

Note that the load due to the weight of the lamp unit 20 is easily applied to the first bearing 61 disposed on the upper side of the pair of bearings. The first bearing 61 on the upper side to which a large load is easily applied in that manner is a ball bearing small in rolling resistance, so that the first bearing 61 is inhibited from deteriorating in sliding at rotation of the rotary shaft 90. Thus, resistance applied at rotation of the rotary shaft 90 is inhibited from increasing.

The first bearing 61 and the second bearing 62 each is a ball bearing, so that resistance applied to the rotary shaft at rotation of the rotary shaft 90 is further inhibited from increasing.

As above, the first bearing 61 is disposed on the spacers 38, so that the load due to the weight of the lamp unit 20 is easily dispersed into the bracket 30 through the first bearing 61. Therefore, the load is inhibited from concentrating on the first bearing 61, so that the first bearing 61 is inhibited from deteriorating in sliding at rotation of the rotary shaft 90. Thus, resistance applied at rotation of the rotary shaft 90 is further inhibited from increasing.

The embodiments have been exemplarily described above for the present invention. However, the present invention is not limited to the embodiments.

According to each of the first embodiment and the second embodiment, the example in which the erect portion 32 is provided at the left end of the main portion 31 of the bracket 30, has been described. However, for example, the erect portion 32 may be formed at the right end or at both of the left end and the right end of the main portion 31 of the bracket 30. In the first embodiment, part of the bracket 30 may be disposed above the lamp unit 20.

According to the first embodiment, the example in which the plurality of fulcrum members, namely, the two fulcrum members 50 are provided side by side in the left and right direction, has been described. However, the number of fulcrum members 50 is not particularly limited, and thus may be one or not less than three. Note that, from the viewpoint of stabilization of the lamp unit 20, preferably, a plurality of fulcrum members 50 is provided side by side in the left and right direction. Preferably, fulcrum members 50 are provided on both of the left side and the right side across a line passing through the center of the lamp unit 20 in the front view of the vehicle headlight 1.

In the first embodiment, the example in which the movable shaft 42 extends horizontally in the forward and backward direction, has been described. However, the movable shaft 42 is not limited in shape.

In the second embodiment, the example in which the bracket 30 includes the cut-away portion 33, has been described. However, the cut-away portion 33 is not essential in configuration.

In the second embodiment, the example in which the aligning member 60 includes the first bearing 61 and the second bearing 62, has been described. However, the aligning member 60 is not limited to a pair of bearings. For example, the aligning member 60 may include one or not less than three bearings.

In the second embodiment, the example in which the first bearing 61 and the second bearing 62 each are a ball bearing, has been described. However, each bearing included in the aligning member 60 is not limited to the ball bearing.

In the second embodiment, the example in which the through hole 33 penetrating in the upward and downward direction is formed at the main portion 31 of the bracket 30 and the first bearing 61 is disposed on the spacers 38 provided on the inner circumferential face of the through hole 33, has been described. Note that the spacers 38 are not an essential constituent element.

As described above, according to the present invention, the vehicle lamp fitting enabling reduction in thickness, can be provided. According to the present invention, the vehicle lamp fitting enabling improvement in design, can be provided. The vehicle lamp fittings are available, for example, in the field of vehicle headlights for automobiles.

REFERENCE SINGS LIST 1 vehicle headlight
2 movable lamp-fitting unit
10 casing
20 lamp unit
21 lamp body
24 joint
30 bracket
31 main portion
32 erect portion
38 spacer
40 actuator
42 movable shaft
50 fulcrum member
60 aligning member
61 first bearing
62 second bearing
70, 170 optical-axis adjustment mechanism
90 rotary shaft
91 first shaft
92 second shaft

The invention claimed is:

1. A vehicle lamp fitting comprising:
a lamp body housing a light source;
a joint secured to a lower portion of the lamp body;
a bracket connected with the joint; and
an actuator including a movable shaft that moves upward and downward,
wherein the joint is connected to the bracket through a fulcrum member pivotable to the bracket, and
the movable shaft is connected to the joint on a rear side of the fulcrum member, wherein
the bracket includes a main portion extending in a left and right direction and an erect portion extending in an upward and downward direction on at least one of a left end and a right end of the main portion, and
an optical-axis adjustment mechanism that adjusts an emission direction of light from the light source in the upward and downward direction, is mounted on the erect portion.

2. The vehicle lamp fitting according to claim 1, wherein a plurality of the fulcrum members is provided side by side in a left and right direction.

3. The vehicle lamp fitting according to claim 1, wherein the movable shaft extends horizontally in a forward and backward direction.

4. A vehicle lamp fitting comprising:
a lamp body housing a light source;
a joint secured to a lower portion of the lamp body;
a bracket connected with the joint; and
an actuator including a movable shaft that moves upward and downward,
wherein the joint is connected to the bracket through a fulcrum member pivotable to the bracket,
the movable shaft is connected to the joint on a rear side of the fulcrum member,
the bracket includes a cut-away portion at a back of the bracket, and
at least part of a connection between the joint and the movable shaft is housed in the cut-away portion when the connection is located at a lowest level.

5. The vehicle lamp fitting according to claim 4, wherein a plurality of the fulcrum members is provided side by side in a left and right direction.

6. The vehicle lamp fitting according to claim 4, wherein the movable shaft extends horizontally in a forward and backward direction.

7. A vehicle lamp fitting comprising:
a bracket including a main portion extending in a left and right direction and an erect portion extending in an upward and downward direction on at least one of a left end and a right end of the main portion;
a lamp unit disposed above the main portion of the bracket, the lamp unit including a first shaft extending downward;
an actuator disposed below the main portion of the bracket, the actuator including a second shaft extending upward, the actuator being configured to rotate the second shaft around an axis of the second shaft;
an aligning member secured to the main portion of the bracket, the aligning member holding a rotary shaft including the first shaft and the second shaft coupled, rotatably; and an optical-axis adjustment mechanism mounted on the erect portion, the optical-axis adjustment mechanism being capable of adjusting an optical axis of the lamp unit in the upward and downward direction, wherein the bracket is not formed above the lamp unit.

8. The vehicle lamp fitting according to claim 7, wherein the aligning member is a pair of bearings disposed at a predetermined interval in the upward and downward direction.

9. The vehicle lamp fitting according to claim 8, wherein a through hole penetrating in the upward and downward direction is formed at the main portion of the bracket, and the bearing provided on an upper side of the pair of bearings is disposed on a spacer provided on an inner circumferential face of the through hole.

10. The vehicle lamp fitting according to claim 8, wherein the bearing disposed on an upper side of the pair of bearings is a ball bearing.

11. The vehicle lamp fitting according to claim 8, wherein the pair of bearings each is a ball bearing.

12. A vehicle lamp fitting comprising:
a lamp body housing a light source;
a joint secured to a lower portion of the lamp body;
a bracket connected with the joint; and
an actuator including a movable shaft that moves upward and downward, wherein the joint is connected to the bracket through a fulcrum member pivotable to the bracket, and the movable shaft is connected to the joint on a rear side of the fulcrum member, and the movable shaft extends horizontally in a forward and backward direction.

13. The vehicle lamp fitting according to claim 12, wherein a plurality of the fulcrum members is provided side by side in a left and right direction.

* * * * *